United States Patent
Kazantsev

(10) Patent No.: US 9,749,828 B2
(45) Date of Patent: Aug. 29, 2017

(54) COMMUNICATION SYSTEM AND METHOD FOR MAKING TELEPHONE CALLS OVER THE INTERNET

(71) Applicant: Kirill Kazantsev, Yurlovo (RU)

(72) Inventor: Kirill Kazantsev, Yurlovo (RU)

( * ) Notice: Subject to any disclaimer, the term of this patent is extended or adjusted under 35 U.S.C. 154(b) by 323 days.

(21) Appl. No.: 14/082,362

(22) Filed: Nov. 18, 2013

(65) Prior Publication Data

US 2015/0139039 A1 May 21, 2015

(51) Int. Cl.
*H04W 4/22* (2009.01)
*H04W 4/02* (2009.01)
*H04W 4/14* (2009.01)
*H04M 3/51* (2006.01)

(52) U.S. Cl.
CPC .......... *H04W 4/22* (2013.01); *H04M 3/5116* (2013.01); *H04W 4/02* (2013.01); *H04W 4/14* (2013.01); *H04M 2207/20* (2013.01); *H04M 2242/04* (2013.01); *H04M 2242/30* (2013.01)

(58) Field of Classification Search
CPC ................................................ G01C 21/3407
See application file for complete search history.

(56) References Cited

U.S. PATENT DOCUMENTS

| | | | | |
|---|---|---|---|---|
| 2004/0015380 | A1* | 1/2004 | Timmins | 705/8 |
| 2007/0201646 | A1* | 8/2007 | Metcalf | H04M 15/06 379/142.01 |
| 2008/0195702 | A1* | 8/2008 | Matz | H04W 4/02 709/204 |
| 2011/0258266 | A1* | 10/2011 | Serra et al. | 709/206 |
| 2011/0263219 | A1* | 10/2011 | Hasenfang | H04L 12/66 455/404.2 |
| 2012/0196581 | A1* | 8/2012 | Papakipos et al. | 455/415 |
| 2013/0244609 | A1* | 9/2013 | Velusamy | H04W 4/22 455/404.1 |
| 2014/0065997 | A1* | 3/2014 | Walker | H04W 4/02 455/404.1 |
| 2014/0101611 | A1* | 4/2014 | Lang et al. | 715/813 |
| 2014/0134988 | A1* | 5/2014 | Madhavapeddi | H04W 4/00 455/415 |
| 2014/0157381 | A1* | 6/2014 | Disraeli | 726/7 |
| 2014/0270098 | A1* | 9/2014 | Maw | H04M 3/5116 379/45 |
| 2015/0131791 | A1* | 5/2015 | Mayana et al. | 379/210.01 |

OTHER PUBLICATIONS

Samuel Axon, 5 Ways to Use Google Voice for Your Business, Sep. 28, 2010, http://mashable.com/2010/09/28/google-voice-business/, paragraphs 2-4.*
Kremlacek, Randy, "Know Your E911 Before Emergencies Happen", Feb. 1, 2013, Teledynamic, http://www.teledynamic.com/blog/bid/171134/Know-Your-E911-Before_Emergencies-Happen.*

* cited by examiner

*Primary Examiner* — Noel Beharry
*Assistant Examiner* — Rodrick Mak
(74) *Attorney, Agent, or Firm* — Nadya Reingand

(57) ABSTRACT

A system and related method are disclosed for sending SMS messages and phone calls via a Voice over Internet Protocol network. Disclosed embodiments permit the insertion of user identification data into the calls or SMS messages such that the recipient's phone displays that data as caller identification. Additional embodiments include geographical data such as GPS coordinates in the caller identification data to permit the immediate location of emergency calls.

13 Claims, 5 Drawing Sheets

COMMUNICATION SYSTEM AND METHOD FOR MAKING TELEPHONE CALLS OVER THE INTERNET

RELATED APPLICATION DATA

This application claims the priority of prior U.S. provisional application Ser. No. 61/727,299 filed on Nov. 16, 2012, which is hereby incorporated by reference herein in its entirety.

TECHNICAL FIELD

The present invention relates generally to communication systems and methods, and more specifically to communication systems and methods for making phone calls over the Internet.

BACKGROUND ART

The many Voice over Internet Protocol (VoIP) clients currently on the market, such as SKYPE®, have changed the way we think about communication and keeping in touch with loved ones over great distances. The advent and widespread use of VoIP clients on personal computers has increased the popularity of VoIP services. As little as ten years ago, most people had to rely on expensive mobile and Public Switched Telephone Networks (PSTN) to carry their voice over short and long distances. Today, however, almost everyone seems to be using VoIP technology in one way or another. Instead of sending signals via a PSTN network, be it analog or digital, a VoIP application usually uses Session Initiation Protocol (SIP) to create data packets, and transmits the data packets using the same network used for email and web browsing.

By using data packets, the technology can be used to carry more than the standard mono voice the old telephone carries: VoIP can carry text, images, live video and high quality stereo sound as well as 'screen sharing', depending on the speed and reliability of the internet connection. With the continually expanding broadband users market, more people are able to use VoIP without investing in a separate physical connection or contracts.

These communication systems allow the user of mobile devices such as personal computers to communicate across a packet-based computer network such as the Internet in much the same way that they once used the traditional phone network. Cellular IP phones configured with a VoIP client allow the IP phone user to enjoy the same free VoIP service as a personal computer user. This, however, requires a special Wi-Fi phone, or a dual-system phone with a VoIP client installed. VoIP systems are beneficial to the user as they are often of significantly lower cost than conventional fixed line or mobile networks. This may particularly be the case for long-distance and international communication, where traditional phone calls can be substantially more expensive. To use a VoIP system, the user installs and executes client software on their computer, phone, or other mobile device. The client software coordinates with a server to provide the VoIP connections as well as other functions such as registration and authentication.

In addition to voice communication, the client may also provide further features such as video calling, instant messaging (IM), Short Message Service (SMS) messaging, file transfer and voicemail. The Short Message Peer-to-Peer (SMPP) protocol is used for SMS messaging. The SMPP protocol is a telecommunications industry protocol for exchanging SMS messages between SMS peer entities such as short message centers and/or external short messaging entities. The most commonly used versions of SMPP are v3.3, which supports both transmission and reception of SIMS messages on distinct connections and is the most widely supported standard, and v3.4, which adds transceiver support, allowing both transmission and reception tasks to be performed on a single connection.

Although they are much more versatile than traditional PSTN communications, currently existent VoIP communication systems have been criticized by many for lack of user-friendly features, such a caller identification and a call back feature allowing the recipient of a call that comes from the VoIP system to recognize a mobile number of a caller to call the mobile number of the caller back. The same features are lacking for sending and receiving SMS messages via VoIP communication networks. This inability to see the caller identification of VoIP callers and SMS message originators in turn exposes the recipient to the risk of fraud or unwanted solicitations.

In addition, emergency services have strongly objected to the use of VoIP for emergency calls due to the inability to locate the caller within a reasonable area. For example, a user connected to the office virtual private network would appear to be in the server building instead of the real location. This means that a person who places a VoIP emergency call and subsequently cannot speak to the emergency service provider will be very unlikely to receive assistance sufficiently quickly to prevent injury and death. In contrast, emergency calls transmitted via wired telephone networks and to some extent mobile phone networks generally enable emergency workers to determine the location from which the emergency call originated rapidly, either by looking up the address of the land-line connection in the former case, or the cell tower or Global Positioning System (GPS) location in the latter. It is not difficult to imagine scenarios in which the victim of a heart attack or similar emergency would find him or herself unable to speak after placing a call, so this deficiency of VoIP telephone service is potentially a matter of life and death.

SUMMARY OF THE EMBODIMENTS

It is therefore an object of the present invention to provide a VoIP communication system and method that is characterized by user-friendly features that allow the recipient of a call or SMS message to identify the caller by caller's mobile phone number and call back to that caller using a caller's mobile phone number.

It is further object of the present invention to provide a VoIP communication system and method that is characterized by increased security, caller verification and identification.

It is yet further object of the present invention to provide a VoIP communication system and method that allows to determine the caller's real location and locate the caller within a reasonable area during emergency.

One embodiment of the disclosed invention is involves using a web-based application or mobile application, the latter of which would be downloadable on a mobile device such as a smart-phone, tablet, or computer, which accepts user identification data from a user that includes a mobile telephone number, and stores that telephone number in a database upon verifying that it belongs to the user. The method further involves sending phone calls and SMS messages over the VoIP communication network, with some part of the user identification data linked to the user's address-of-record or caller identification, so that the user identification data displays on the recipient's phone as caller identification. Finally, the method involves receiving calls and SMS messages other telephones or devices over the VoIP network.

A further embodiment involves using a verification process in which a code made up of live decimal numbers is sent the mobile number provided by the user, and compared to the five decimal numbers the user enters in the application. Another embodiment involves verifying the mobile phone number by calling the user at that number. According to an additional embodiment, the user identification data is linked to the user's address-of-record or caller identification by inserting it into the field indicating the device that originated the message, such as the "source_addr" field when sending SMS messages. A further embodiment accomplishes the same linking for VoIP calls by placing the user identification data in the field indicating the logical identity of the device initiating the phone call session, such as the "FROM" field according to SIP protocol. In yet another embodiment, the user identification data so linked includes the verified mobile phone number entered by the user. In still another embodiment, the linked data contains a user name generated by the system or entered by the user. According to a further embodiment, the linked data includes a virtual phone number, rendering anonymous the number entered by the user. Finally, one embodiment includes in the linked data the geographical coordinates generated by the user's mobile device.

Also disclosed herein is a system. One embodiment of the disclosed system includes at least one mobile device and at least one server, the two of which are connected via a VoIP network. The server and the mobile device are together configured to perform operations creating a web application or mobile application installed on the mobile device, and that application is designed to collect user identification data including a mobile number as entered by a user on the mobile device, perform an operation to verify the mobile number, store the user identification data in a database of registered users maintained by the server, link some part of the user identification data to the user's address-of-record or caller identification, send SMS messages and phone calls, including said address-of-record/caller identification via a VoIP communication network to mobile device of the recipient, and receive call backs or messages from mobile device of the recipient and send them via the VoIP communication network to a mobile device of a registered user.

In another embodiment, the web application is configured to perform the verification task described above by generating a code made up of five decimal numbers, sending that code to the mobile number the user provided via the VoIP network, receiving a user-input code, and comparing the user-input code to the generated code, continuing with the registration of the user only if the two codes matched. In another embodiment, the application is configured to perform the verification by calling the mobile number over the VoIP network. According to an additional embodiment, the application is configured to link user identification data to the user's address-of-record or caller identification by inserting it into the field that indicates the device that originated the message, such as the "source_addr" field when sending SMS messages. A further embodiment involves the application linking the data for VoIP calls by placing the user identification data in the field that indicates the logical identity of the device initiating the phone session, such as the FROM field according to SIP protocol. In yet another embodiment, the user identification data the application is configured to link includes the verified mobile phone number entered by the user. In still another embodiment, the data the application links data contains a user name generated by the system or entered by the user. According to a further embodiment, the application is designed to link data that includes a virtual phone number, rendering anonymous the number entered by the user. Finally, one embodiment involves configuring the application to include in the linked data the geographical coordinates generated by the user's mobile device.

Other aspects, embodiments and features of the invention will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

DETAILED DESCRIPTION OF SPECIFIC EMBODIMENTS

Figure 1:
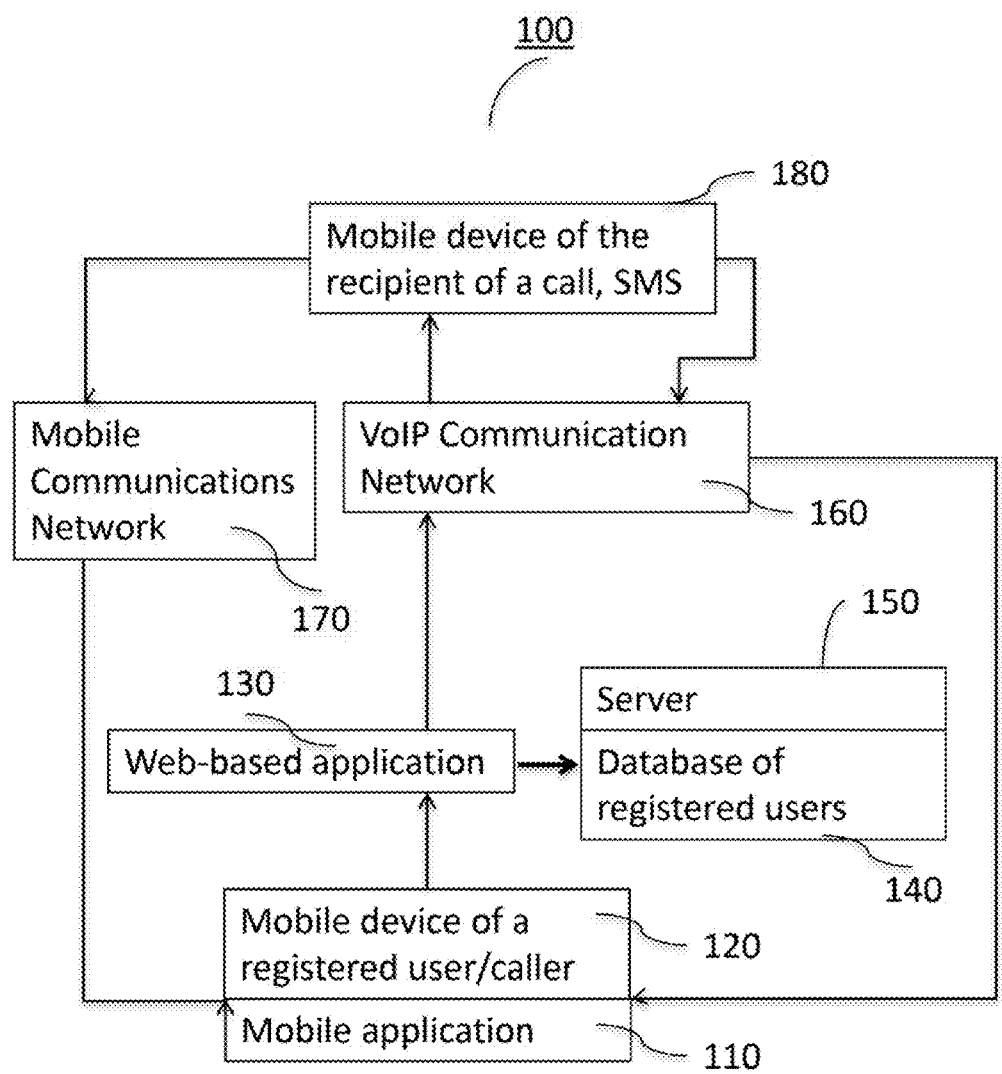
FIG. 1 is a diagram illustrating a system in accordance with one embodiment of the present invention.

The present invention is a system and method for VoIP communication that enables calls and messages transmitted via VoIP network to contain caller identification information of the kind currently available on mobile networks. The disclosed method and system also permit the transmission of geographical coordinates, permitting emergency workers to ascertain the geographical location from which an emergency call was placed, correcting one of the principal drawbacks of previously existent VoIP systems. The information about the geographical location also allows connection to the information on the web on how to get to this location. This service is useful for various businesses such as plumbers, home improvement workers, etc. Optionally, the application is connected to the services that provide the weather is that location, services providing ticket purchase, etc.

Definitions. As used in this description and the accompanying claims, the following terms shall have the meanings indicated, unless the context otherwise requires.

"User identification data" is data entered by a user upon initial registration, such as a name, mobile phone number, user identification number, or data subsequently generated by the system, such as Global Positioning System ("GPS") coordinates.

An "electronic device" is defined herein as including personal computers, laptops, tablets, smart phones, and any other electronic device capable of supporting an application as claimed herein.

A device or component is "coupled" to an electronic device if it is so related to that device that the product or means and the device may be operated together as one machine. In particular, a piece of electronic equipment is coupled to an electronic device if it is incorporated in the electronic device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the electronic device by shared membership in some network consisting of wireless and wired connections between multiple machines (e.g. a printer in an office that prints documents to computers belonging to that office, no matter where they are, so long as they and the printer can connect to the internet).

An electronic device's "data entry devices" are the set of components coupled to the electronic device by means of which a user can enter data into the device. Data entry devices include without limitation digital cameras, microphones, keyboards, touchscreens, track-pads, and computer mouses.

An electronic device's "manual data entry means" is the set of all data entry devices coupled to the electronic device that permit the user to enter data into the electronic device using manual manipulation. Manual entry means include without limitation keyboards, keypads, touchscreens, trackpads, computer mouses, buttons, and other similar components.

A "call" or "phone call" is a session in which two devices connected by some network communicate via video or audio streams. Calls and phone calls include voice phone calls, such as would be used in a traditional phone system, and video calls, and can involve two devices or multiple devices (e.g. a conference call).

Figure 3:
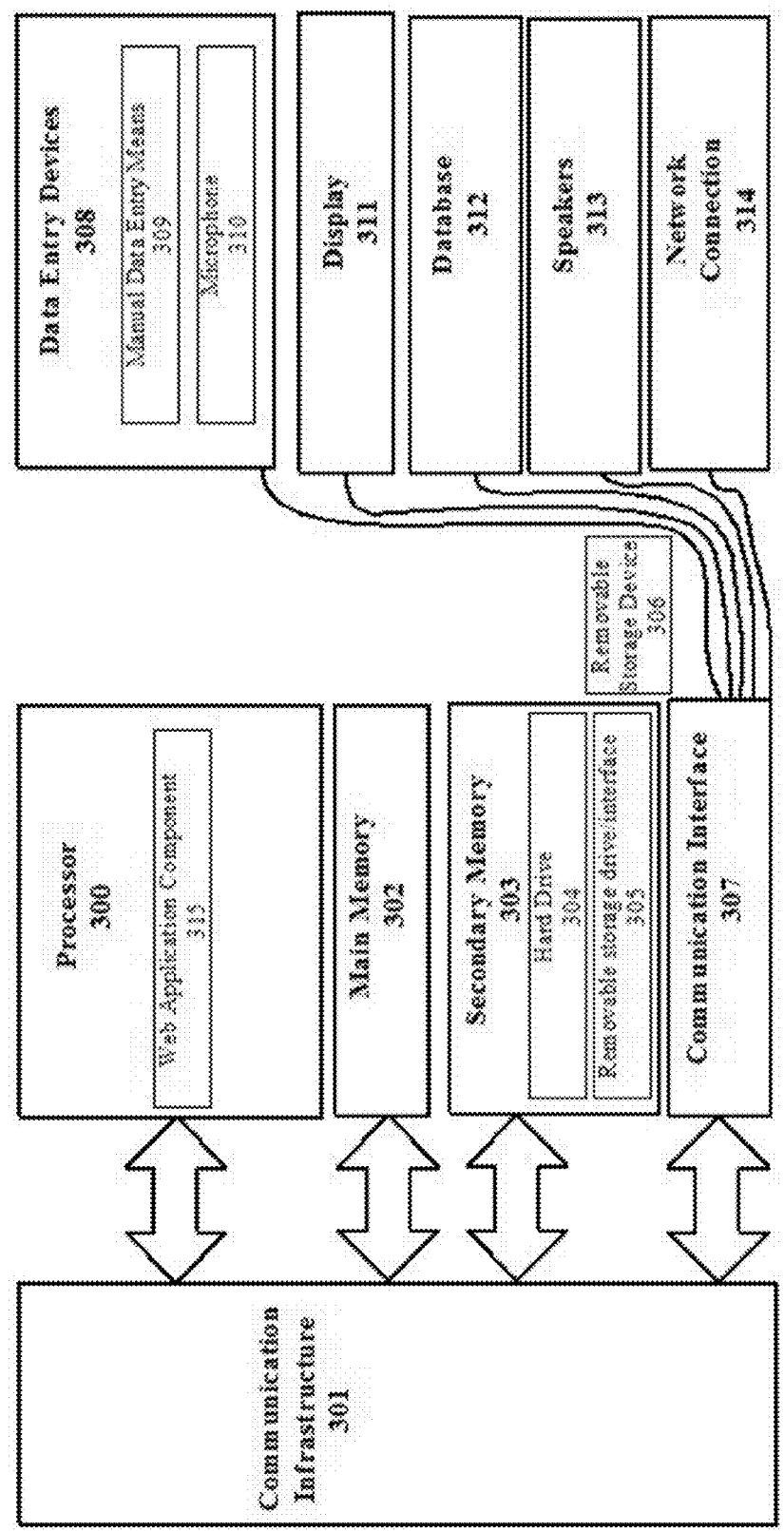
FIG. 3 is a schematic diagram representing a generic electronic device, such as the mobile devices and servers that comprise the disclosed system.

The system and method disclosed herein will be better understood in light of the following observations concerning electronic devices. An exemplary electronic device is illustrated by FIG. 3. The processor 300 may be a special purpose or a general purpose processor device. As will be appreciated by persons skilled in the relevant art, the processor device 300 may also be a single processor in a multi-core/multiprocessor system, such system operating alone, or in a cluster of computing devices operating in a cluster or server farm. The processor 300 is connected to a communication infrastructure 301, for example, a bus, message queue, network, or multi-core message-passing scheme.

The electronic device also includes a main memory 302, such as random access memory (RAM), and may also include a secondary memory 303. Secondary memory 303 may include, for example, a hard disk drive 304, a removable storage drive or interface 305, connected to a removable storage unit 306, or other similar means. As will be appreciated by persons skilled in the relevant art, a removable storage unit 306 includes a computer usable storage medium having stored therein computer software and/or data.

Examples of additional means creating secondary memory 303 may include a program cartridge and cartridge interface (such as that found in video game devices), a removable memory chip (such as an EPROM, or PROM) and associated socket, and other removable storage units 306 and interfaces 305 which allow software and data to be transferred from the removable storage unit 306 to the computer system.

The electronic device may also include a communications interface 307. The communications interface 307 allows software and data to be transferred between the electronic device and external devices. The communications interface 307 may include a modem, a network interface (such as an Ethernet card), a communications port, a PCMCIA slot and card, or other means to couple the electronic device to external devices. Software and data transferred via the communications interface 307 may be in the form of signals, which may be electronic, electromagnetic, optical, or other signals capable of being received by the communications interface 307. These signals may be provided to the communications interface 307 via wire or cable, fiber optics, a phone line, a cellular phone link, an RF link or other communications channels. The communications interface in the system embodiments discussed herein facilitates the coupling of the electronic device with data entry means 308, which can include such manual entry means 309 as keyboards, touchscreens, mouses, and trackpads, microphones 310, the device's display 311, a database 312, speakers 313, and network connections, whether wired or wireless 314. It should be noted that each of these means may be embedded in the device itself, attached via a port, or tethered using a wireless technology such as BLUETOOTH®.

Computer programs (also called computer control logic) are stored in main memory 302 and/or secondary memory 303. Computer programs may also be received via the communications interface 307. Such computer programs, when executed, enable the processor device 302 to implement the system embodiments discussed below. Accordingly, such computer programs represent controllers of the system. Where embodiments are implemented using software, the software may be stored in a computer program product and loaded into the electronic device using a removable storage drive or interface 305, a hard disk drive 304, or a communications interface 307.

Persons skilled in the relevant art will also be aware that while any device must necessarily comprise facilities to perform the functions of a processor 300, a communication infrastructure 301, at least a main memory 302, and usually a communications interface 307, not all devices will necessarily house these facilities separately. For instance, in some forms of electronic devices as defined above, processing 300 and memory 302 could be distributed through the same hardware device, as in a neural net, and thus the communications infrastructure 301 could be a property of the configuration of that particular hardware device. Many devices do practice a physical division of tasks as set forth above, however, and practitioners skilled in the art will understand the conceptual separation of tasks as applicable even where physical components are merged.

Figure 4:
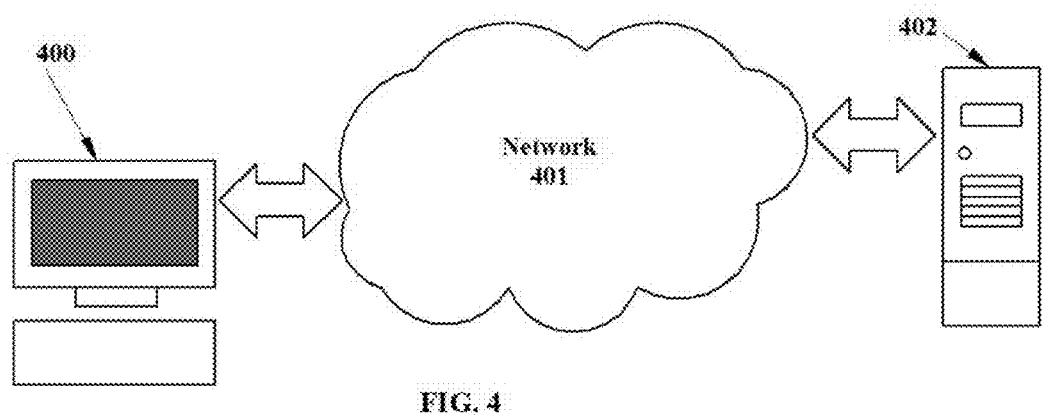
FIG. 4 is a schematic diagram representing the infrastructural platform on which web applications are developed.

Persons of ordinary skill in the art will recognize a web application as a particular kind of computer program system designed to function across a network, such as the Internet. A schematic illustration of a web application platform is provided in FIG. 4. Web application platforms typically include at least one client device 400, which is an electronic device as described above. The client device 400 connects via some form of network connection to a network 401, such as the Internet. Also connected to the network 401 is at least one server device 402, which is also an electronic device as described above. Of course, practitioners of ordinary skill in the relevant art will recognize that a web application can, and typically does, run on several server devices 402 and a vast and continuously changing population of client devices 400. Computer programs on both the client device 400 and the server device 402 configure both devices to perform the functions required of the web application. Web applications can be designed so that the bulk of their processing tasks are accomplished by the server device 402, as configured to perform those tasks by its web application program, or alternatively by the client device 400. However, the web application must inherently involve some programming on each device. Many electronic devices, as defined herein, come equipped with a specialized program known as a web browser, that enables them to act as a client device 400 at least for the purposes of receiving and displaying data output by the server device 402 without any additional programming. Web browsers can also act as a platform to run so much of a web application as is being performed by the client device 400, and it is a common practice to write the portion of a web application calculated to run on the client device 400 to be operated entirely by a web browser. However, it is also possible to write programs that do not run on web browsers but still cause an electronic device to operate as a web application client 400. Thus, as a general matter, web applications require some computer program configuration of both the client device 400 (or devices) and the server device 402 (or devices). The computer program that comprises the web application component 315 on either electronic device's system FIG. 3 configures that device's processor 300 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance.

Figure 2:
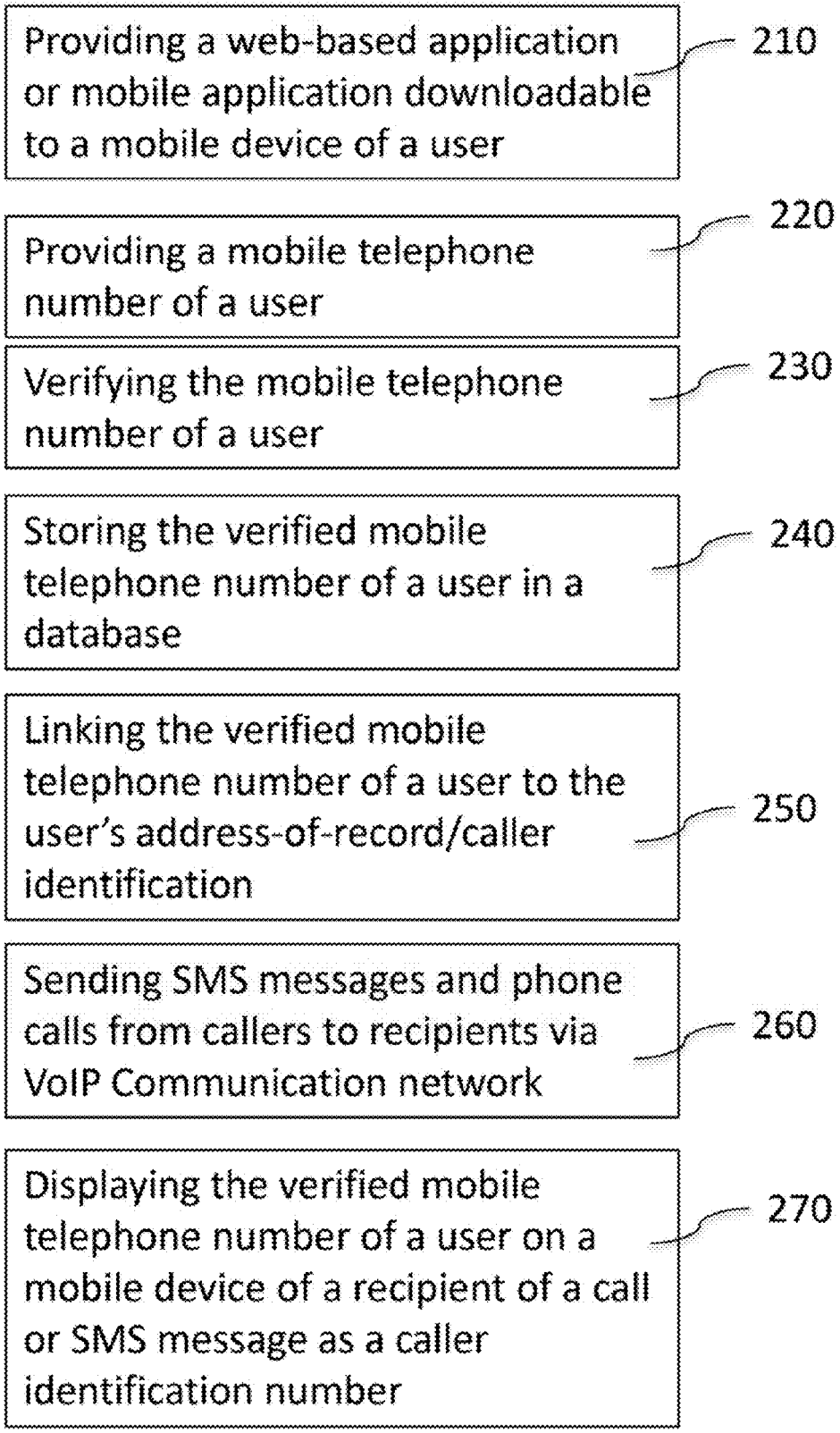
FIG. 2 is a flow chart illustrating a method in accordance with one embodiment of the present invention.

The method of using the VoIP communication system according to one embodiment of the present invention is illustrated in FIG. 2. The method involves providing a web application, as discussed above, to be run on at least one mobile device, defined herein as an electronic device designated to perform the client-device functions for the web application, and one server. The client-side program portion of the web application could be either the web-based application or mobile application downloadable on the mobile device 210. Additional steps in the method involve receiving user identification data including a mobile telephone number from a user 220, verifying the mobile telephone 230, storing the user identification data in a database 240, linking the user identification data to the user's address-of-record or caller identification 250, sending SMS messages or phone calls from the user to recipients via the VoIP communication network 260, and displaying the user identification data on a mobile device of a recipient of a call or SMS message as caller identification 270. The receiver device 270 may be in the VoIP network or may be a phone or other mobile device on a traditional wired or mobile phone network. Practitioners skilled in the relevant art will be aware of the protocols for establishing VoIP calls using Session Initiation Protocol (SIP), followed by a session of two-way audio or video streaming in which the phone call's communication takes place, and terminated by ending the session. Likewise, practitioners skilled in the relevant art will be familiar with the various protocols for sending and receiving SMS messages over VoIP networks. A final step involves using the caller identification data link thus created to link call-backs to the user, thus joining the return call or answering SMS message to the instant user over VoIP.

FIG. 1 illustrates the corresponding communication system embodiment 100. It comprises a server 150 and a mobile device 120, the latter as defined above, both of which are connected to a VoIP network. The mobile device and server are configured to operate a web application 130, the client device portion of which may be a mobile application 110 installed on the mobile device 120. The web application 130 is configured to register a user of the system by collecting user identification data including the user's mobile phone number, verifying the mobile phone number, and then storing the user identification data in a database of registered users 140 maintained by server 150. The web application 130 is also configured to send SMS messages and phone calls via the VoIP communication network 160 to the mobile device of a recipient 180. The web application is further configured to link some part of the user identification data to the user's address-of-record or caller identification, so that user identification data will display on the recipient's mobile device 180 as caller identification, and so that the system may receive calls or messages from mobile device of the recipient 180 and send them via the VoIP communication network 160 to the mobile device 120.

Figure 5:
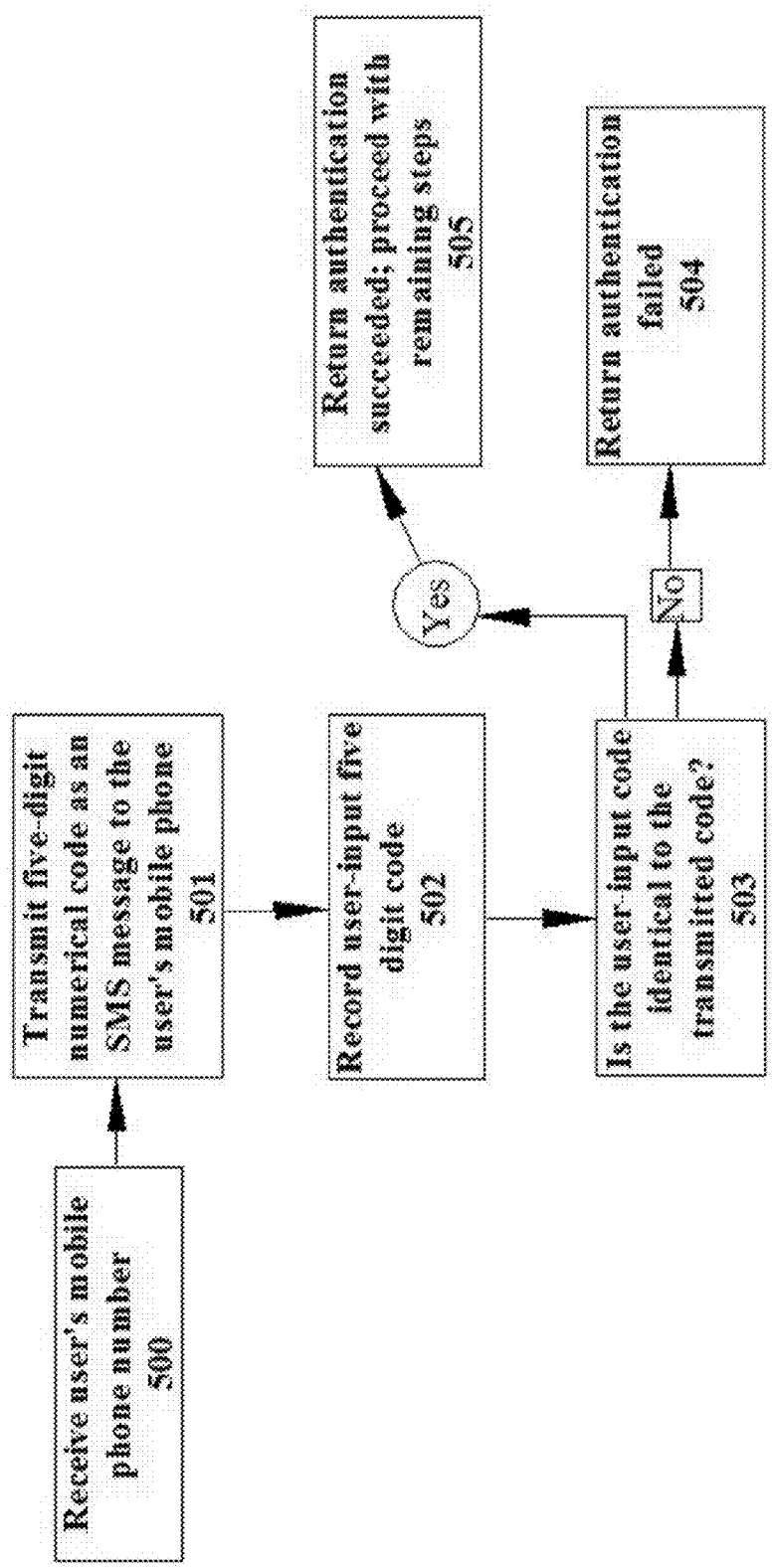
FIG. 5 is a flow chart demonstrating a possible method for verifying the authenticity of a user-supplied mobile number.

According to some embodiments of the method FIG. 2, the verification step 230 is conducted as follows FIG. 5. The web application receives 500 the mobile telephone number of a user as a prerequisite for registration. The application sends 501 via the VoIP communication system an SMS message containing a code generated by the server to the mobile phone corresponding to the mobile phone number provided by the user. The code may contain five decimal numbers The user enters a similar code on the application using the mobile device's manual data entry means 502, and the application verifies the code 503 by comparing the code that was sent to the user with the SMS message and the code entered by the user on the system. If the code is identical 505, then the application registers the user by sending and storing the mobile telephone number of the user along with any other pertinent information such as user's address, user name, and other user identification data on the database of registered users maintained by the server. If the code is not identical, the verification has failed 504, and the remaining method steps will not be performed. In some embodiments, the verification step can alternatively be conducted by calling the phone corresponding to the mobile phone number that the user provided, instead of sending an SMS message with a code.

The above-described verification is performed by system embodiments FIG. 1 by configuring the web application 130, upon receiving the user's mobile number, to verify it by generating, saving in memory, and sending a code generated by the server as an SMS message via the VoIP Communication Network 160 to the mobile phone to which the user-provided mobile number is assigned. Practitioners of ordinary skill in the art will be aware, for example, of electronic devices' ubiquitous ability to generate random or quasi-random (and in practice unpredictable) numbers, and that the statistical likelihood of a coincidental match between randomly generated numbers and humanly guessed numbers is extremely low: for the smallest possible implementation of the code described above, which would be a code consisting of five decimal digits, the odds of a person guessing a particular selection are approximately $1/10^5$, or one in one hundred thousand. The reason why the odds are approximate is that people may be biased toward selecting particular numbers. The application 130 is further configured to receive a code consisting of five decimal numbers from the user via the mobile device's manual data entry means. Finally, the application 130 is configured to compare its generated code to the code entered by the user. The application is configured to proceed with the registration process only if the two codes are identical. A further embodiment of the system involves configuring the web application 130 to place a phone call using the user-provided mobile number to verify that the number is authentic.

The method FIG. 2 step of linking the user identification data of a user to the user's address-of-record or caller identification 250 can be implemented for SMS messages by entering the selected data in the messages' source field, defined herein as the field or fields in the message that indicates the address of the device that originated the message. An example of the source field is the "source_addr" field used when using SMPP v.3.4 protocol for sending SMS messages to mobile devices via a VoIP communication network. The equivalent result is achieved in the system by configuring the web application 130 to enter the portion of the user identification data selected by the programmer into the source field of the message. Persons of ordinary skill in the relevant art will appreciate that the insertion of user identification data in that field causes the chosen user identification data to appear on the recipient's mobile phone or other electronic device 180 as information declaring the origin of the SMS message. The source field is also intended to inform the user and user device where to send an SMS message or phone call in response. That is a principal reason for this embodiment.

For phone calls over the VoIP network, the method step of linking the user identification data to the address-of-record/caller identification 250 may be achieved by specifying the mobile phone number of a user in the from field, defined as the field indicating the logical identity of the caller, in the protocol for initiating the session. When using SIP, the from field is the "FROM" field. The "FROM" field can be written as follows:

From: "79166704708"<mailto: sip%3A79166704708@clickandpay.ru>;tag=as04064b4c, wherein 79166704708 is a mobile phone number of a registered user.

Likewise, a further system embodiment enables the recipient's phone 180 to display the user identification data during a VoIP phone call, by configuring the web application 130 to enter the portion of the user identification data selected by the programmer into the from field when connecting the phone call over the VoIP network 160. As before, the effect of this action is to cause the selected user identification data to appear on the recipient's mobile phone 180, ideally enabling the recipient to respond to the phone call at later date in some fashion.

The choice of user identification data to display 250 can produce a wide range of uses of the system. The most traditional choice to display on the recipient's phone 270 is, of course, the mobile phone number. That choice would enable users of VoIP for phone calls SMS messages to enjoy the caller identification features that ordinary mobile phone users take for granted. Furthermore, the presence of the mobile number in the call information would make it possible for the recipient's phone to call back the user's mobile phone using the mobile phone network as opposed to the VoIP network, giving the user more communication options. In some additional embodiments, other forms of caller identification can be used in lieu of the mobile number, such as a user identification name or virtual mobile number (an arbitrary number selected by the user or generated by the application). As noted above, when the virtual number or username is set as a caller identification, the virtual number or username will be displayed 270 on the mobile device of the recipient of a call or SMS message; and then the recipient can call back to the user's mobile device via the VoIP communications network using the virtual number, by virtue of its association with the user's registered data. This has the advantage of anonymity: if a user does not wish to give out his or her phone number, he or she can choose not to display it; the user could potentially be given an unprecedented further choice: masking the number while still permitting call-back. The equivalent system embodiment involves configuring the web application 130 to add the chosen user identification data, whether it is a mobile phone number, a virtual number, of a user name, to the "source_addr" or "From" fields as described above. The recipient can call back or send SMS message to a mobile phone of a registered user via mobile telephone network 170, or via VoIP communication network 160.

As noted previously, one disadvantage that VoIP has when compared to traditional phone and cellular networks is the inability of emergency workers, in some cases, to locate the geographical origin of an emergency phone call. A further set of embodiments resolves this issue by linking the user's address-of-record/caller identification 250 to the Global Positioning System (GPS) or other geographical coordinates of the caller, enabling to determine a real location of the caller in case of an emergency call. Practitioners of ordinary skill in the relevant art will be aware that many electronic devices now come with built in navigation facilities, such as GPS receivers, that enable them to receive and store the geographical coordinates of the precise locations of the electronic devices. In addition to using this feature for maps and navigation, the electronic devices can be programmed to add this coordinate information to data stored or sent anywhere from the device, in a process sometimes referred to as "Geo-tagging,". If the geographical coordinates of an electronic device so equipped are linked to the user's address-of-record/caller identification 250, they will be displayed 270 on the recipient device. This will provide emergency workers with the means to ascertain the location of an emergency call as quickly and accurately as they are able to now for land-line phone systems. To accomplish the same functionality in the system, the web application 130 must be configured to receive the geographical coordinates from the phone's GPS or equivalent system, and to link them to the user's address-of-record/caller identification.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method for Voice over Internet Communication, performed by at least one mobile device and at least one server connected to a Voice over Internet Protocol communication network, comprising:

receiving user identification data including a mobile telephone number of a user, as entered by a registered user via manual data entry means coupled to said mobile device;

verifying said mobile telephone number;

storing said user identification data including said verified mobile telephone number in a database located on said at least one server, linking part of said user identification data to the user's caller identification, including an address of record of said registered user for emergency communications;
sending Short Message Service messages or phone calls from said registered user to recipients via Voice over Internet Protocol communication network;
displaying said linked user identification data on a mobile device of a recipient of a call or Short Message Service message as a caller identification number; and
receiving calls and Short Message Service messages over the Voice over Internet Protocol network,
wherein verifying the mobile telephone number of a user comprises:
  sending via the Voice over Internet Protocol communication network a Short Message Service message containing a verification code generated by the server to a mobile phone of the user;
  accepting the user-entered verification code generated by the server as entered via said mobile device's manual data entry means;
  comparing the code that was sent to the user with the Short Message Service message and the code entered by the user on the system; and
  proceeding with the remaining steps only if the two codes are identical,
wherein said user identification data linked to the user's caller identification comprises a virtual mobile number provided by the user or generated by the application and geographical coordinates generated by said mobile device, and
wherein if the geographical coordinates of said mobile device are linked to said address of record, said address of record is displayed on said mobile device of said recipient of said call.

2. The method according to claim 1, wherein verifying the mobile number comprises calling the mobile phone corresponding to said mobile number via the Voice over Internet Protocol communication system.

3. The method according to claim 1, wherein linking the user identification data to the user's caller identification comprises entering said part of said user identification data in the source field of a Short Message Service message.

4. The method according to claim 1, wherein linking the user identification data to the user's caller identification comprises specifying said part of said user identification data in the from field of a phone call.

5. The method according to claim 1, wherein said user identification data linked to the user's caller identification comprises said verified mobile telephone number.

6. The method according to claim 1, wherein said user identification data linked to the user's caller identification comprises a user identification name provided by the user or generated by the application.

7. A system comprising:
at least one mobile device and at least one server, each possessing a processor and a memory, both connected to a Voice over Internet Protocol network, their processors together operable to execute instructions to perform functions comprising:
a web application configured to:
  collect user identification data including a mobile number as entered by a registered user via said mobile device's manual data entry means;
  verify said mobile number of the user;
  store said user identification data including said verified mobile number in a database of registered users maintained by the server;
  link part of said user identification data to the user's caller identification, including an address of record of said registered user for emergency communications;
  send Short Message Service messages and phone calls via a Voice over Internet Protocol communication network to a recipient; and
  receive calls or messages and send them via the Voice over Internet Protocol communication network to another device,
wherein said web application is configured to complete said verification function by performing steps comprising:
  sending via the Voice over Internet Protocol communication network a Short Message Service message containing a verification code generated by the server to a mobile phone of the user;
  accepting the user-entered verification code generated by the server as entered via said mobile device's manual data entry means;
  comparing the code that was sent to the user with the Short Message Service message and the code entered by the user on the system; and
  proceeding with the remaining steps only if the two codes are identical,
wherein the user identification data said web application is configured to link to the user's caller identification comprises a virtual mobile number chosen by the user or generated by the application,
wherein said web application is configured to receive geographical coordinates generated by said mobile device and to add them to the user identification data linked to the user's caller identification, and
wherein if the geographical coordinates of said mobile device are linked to said address of record, said address of record is displayed to said recipient.

8. The system according to claim 7, wherein said web application is configured to complete said verification function by performing steps comprising calling the mobile phone corresponding to said mobile number via the Voice over Internet Protocol communication network.

9. The system according to claim 7, wherein said web application is configured to link said user identification data to the user's caller identification by entering part of said user identification data in the source field when sending Short Message Service messages to mobile devices via the Voice over Internet Protocol communication network.

10. The system according to claim 7, wherein said web application is configured to link said user identification data to the user's caller identification by specifying part of said user identification data in the from field when initiating calls to mobile devices via the Voice over Internet Protocol communication network.

11. The system according to claim 7, wherein the user identification data said web application is configured to link to the user's caller identification comprises said verified mobile telephone number.

12. The system according to claim 7, wherein the user identification data said web application is configured to link to the user's caller identification comprises a user identification name provided by the user or generated by the application.

13. The system according to claim 1, wherein said web application is configured to provide a link on a web application about driving direction to a place where the user is located.

* * * * *